(12) United States Patent
Davis (10) Patent No.: US 9,016,451 B2
(45) Date of Patent: Apr. 28, 2015

(54) ONE WAY WEDGE CLUTCH WITH REDUCED FREEWHEEL FRICTION

(71) Applicant: Schaeffler Technologies AG & Co. KG, Herzogenaurach (DE)

(72) Inventor: Michael C. Davis, Sterling, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/937,499

(22) Filed: Jul. 9, 2013

(65) Prior Publication Data

US 2014/0014454 A1 Jan. 16, 2014

Related U.S. Application Data

(60) Provisional application No. 61/669,754, filed on Jul. 10, 2012.

(51) Int. Cl.
| | |
|---|---|
| *F16D 41/20* | (2006.01) |
| *F16D 41/08* | (2006.01) |
| *F16D 41/063* | (2006.01) |
| *G01C 21/36* | (2006.01) |
| *G06T 11/60* | (2006.01) |

(52) U.S. Cl.
CPC .......... *F16D 41/063* (2013.01); *G01C 21/3632* (2013.01); *G06T 11/60* (2013.01)

(58) Field of Classification Search
None
See application file for complete search history.

(56) References Cited

U.S. PATENT DOCUMENTS

| 2,803,324 | A | * | 8/1957 | Dodge | 192/45.1 |
|---|---|---|---|---|---|
| 3,202,250 | A | | 8/1965 | Fulton | |
| 5,020,648 | A | * | 6/1991 | Bush et al. | 192/46 |
| 6,125,978 | A | | 10/2000 | Ando et al. | |
| 6,386,349 | B1 | * | 5/2002 | Welch | 192/43 |
| 8,020,681 | B2 | * | 9/2011 | Davis | 192/45.1 |
| 2009/0159390 | A1 | | 6/2009 | Davis | |

FOREIGN PATENT DOCUMENTS

| JP | 05-126168 | 6/1993 |
|---|---|---|
| KR | 20-1998-0053504 | 10/1998 |

OTHER PUBLICATIONS

International Search Report dated Oct. 11, 2013 for International Appl. No. PCT/US2013/049678 (filed Jul. 9, 2013); 10 pages.

* cited by examiner

*Primary Examiner* — Gene Crawford
*Assistant Examiner* — Mark Manley
(74) *Attorney, Agent, or Firm* — Simpson & Simpson, PLLC (57) ABSTRACT

A one-way clutch, including: a plurality of first ramps with respective first face surfaces orthogonal to an axis of rotation or forming a first acute angle with the first line. The clutch includes at least one wedge plate including a smooth second outer circumference and a first inner circumference with a plurality of second ramps with respective second face surfaces orthogonal to the axis of rotation in the radial direction or forming a second acute angle with the second line. The clutch includes an outer race including a second inner circumference. The outer race is rotatable with respect to the inner race in a circumferential direction. For relative rotation of the outer race in the direction, at least one, but not all, first face surfaces is in contact with second face surface. Rotation of the outer race in an opposite circumferential direction locks the inner and outer races.

10 Claims, 7 Drawing Sheets

PRIOR ART

Fig. 7

ONE WAY WEDGE CLUTCH WITH
ONE WAY WEDGE CLUTCH WITH REDUCED FREEWHEEL FRICTION

CROSS-REFERENCE TO RELATED APPLICATIONS

This application claims the benefit under 35 U.S.C. §119 (e) of U.S. Provisional Patent Application No. 61/669,754, filed Jul. 10, 2012, which application is incorporated herein by reference in its entirety.

TECHNICAL FIELD

The present disclosure relates to a one-way clutch with reduced freewheel friction, in particular, a one-way wedge clutch minimizing contact between wedge plates and an outer race in a free wheel mode.

BACKGROUND

Figure 7:
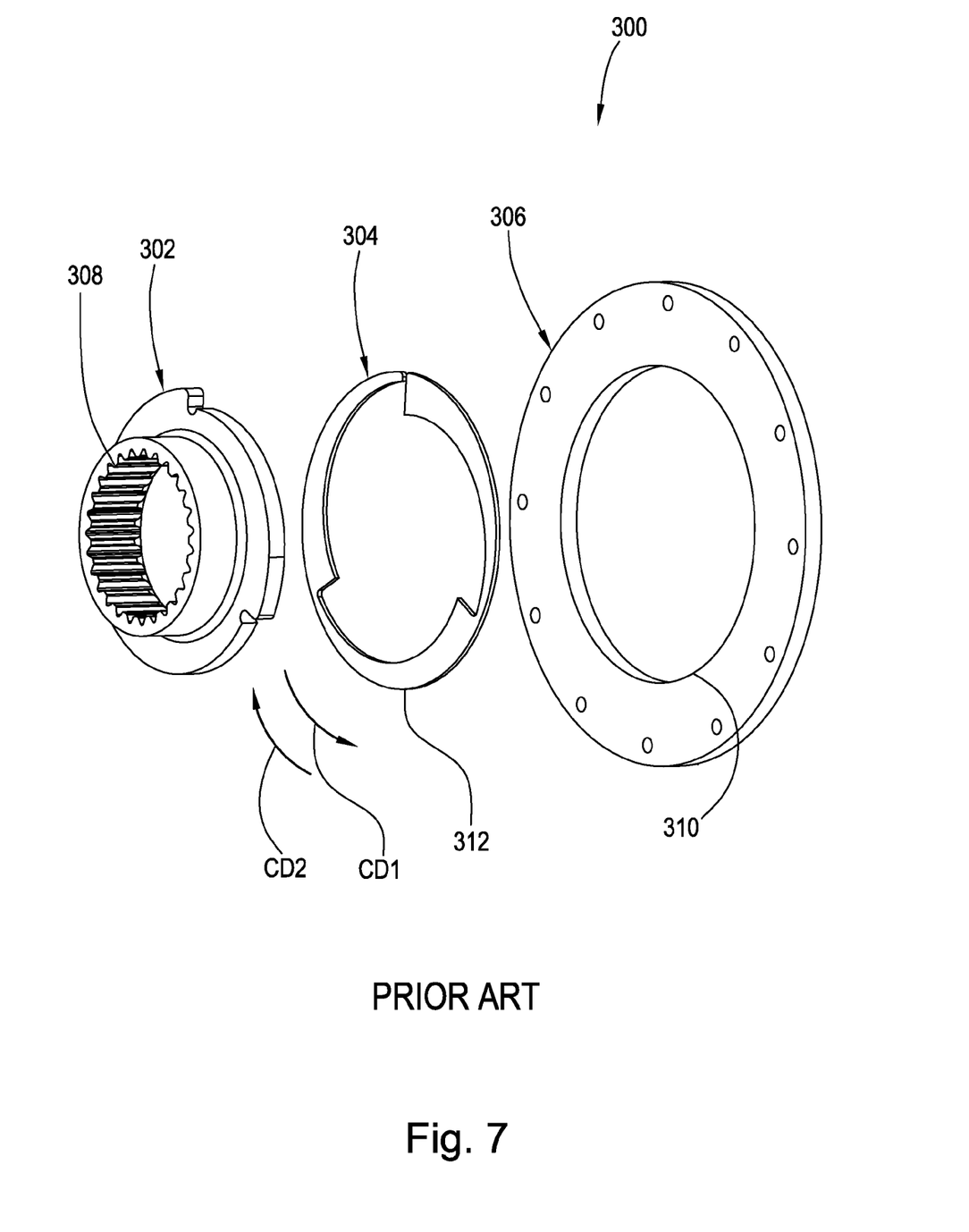
FIG. 7 is an exploded view of a prior art one-way clutch.

FIG. 7 is an exploded view of one-way clutch 300 from commonly owned U.S. patent application Ser. No. 12/316, 219, filed Dec. 10, 2008. Clutch 300 includes inner race 302, wedge plate 304, and outer race 306. Race 302 is fixed against rotation via splines 308. When the outer race rotates in circumferential direction CD1, clutch 300 is in free wheel mode, the outer race rotates with respect to the inner race and the wedge plates, and the entire inner circumference 310 of the outer race is in frictional engagement with the outer circumference 312 of the wedge plate. When the outer race reverses direction to rotate in circumferential direction CD2 (locking mode), the wedge plates expand against the inner and outer races to lock rotation of the outer race to rotation of the inner race, that is, to rotationally fix the outer race.

Some frictional engagement of the wedge plate and outer race is necessary to enable the clutch to shift from free wheel mode to locking mode; however, the frictional engagement also opposes rotation of the outer race, which dissipates a torque load applied the outer race. Thus, the frictional engagement decreases the efficiency of a device using clutch 300. In clutch 300 the frictional engagement and attendant decrease in efficiency is maximized due to the full contact of circumferences 310 and 312.

U.S. Pat. No. 3,202,250 discloses a one-way clutch with an inner race, one or more wedges, and an outer race. As described above, the full extent of the respective outer circumferences of the wedges are engaged with the inner circumference of the outer race, resulting in the maximization of the frictional inefficiencies described above.

SUMMARY

According to aspects illustrated herein, there is provided a one-way clutch, including: an inner race including a first outer circumference with a plurality of first ramps, each first ramp including: a respective first face surface orthogonal to an axis of rotation for the one-way clutch or forming a first acute angle with a first line orthogonal to the axis of rotation; and a respective first ramp surface with a first end connected to the respective first face surface and a second end more radially inward than the first end. The clutch includes at least one wedge plate including a smooth second outer circumference and a first inner circumference with a plurality of second ramps, each second ramp including: a respective second face surface orthogonal to the axis of rotation in the radial direction or forming a second acute angle with a second line orthogonal to the axis of rotation; and a respective second ramp surface with a third end connected to the respective second face surface and a fourth end more radially outward than the third end. The clutch includes an outer race including a second inner circumference. The outer race is rotatable with respect to the inner race in a first circumferential direction. For relative rotation of the outer race with respect to the inner race in the first circumferential direction, at least one, but not all, of the respective first face surfaces are in contact with respective second face surfaces. Rotation of the outer race in a second circumferential direction, opposite the first circumferential direction, causes the rotation of the outer race to lock to rotation of the inner race.

According to aspects illustrated herein, there is provided a one-way clutch, including: an axis of rotation, an inner race including a first outer circumference including a plurality of first ramps, each first ramp including a respective first face surface orthogonal to the axis of rotation or forming a first acute angle with a first line orthogonal to the axis of rotation, and at least one wedge plate including: a second outer circumference; a radially disposed gap separating first and second ends of the at least one wedge plate such that the at least one wedge plate is wholly discontinuous in a circumferential direction at the gap; and a first inner circumference with a plurality of second ramps, each second ramp including a respective second face surface orthogonal to the axis of rotation or forming a second acute angle with a second line orthogonal to the axis of rotation. The one-way clutch includes an outer race with a second inner circumference. The plurality of first face surfaces is at least partially aligned with the plurality of second surfaces in a circumferential direction. For relative rotation of the outer race with respect to the inner race in a first circumferential direction: at least a portion of the second outer circumference is in contact with the second inner circumference; at least one, but not all, of the first face surfaces are in contact with respective second face surfaces; and the closer respect first and second face surfaces in contact are to the gap in the first circumferential direction, the less a magnitude of a radially outward force exerted by the at least one wedge plate on the outer race. Rotation of the outer race in a second circumferential direction, opposite the first circumferential direction, causes the rotation of the outer race to lock to rotation of the inner race.

According to aspects illustrated herein, there is provided a one-way clutch, including: an axis of rotation, an inner race including a first outer circumference including a plurality of first ramps, each first ramp including a respective first face surface orthogonal to the axis of rotation or forming a first acute angle with a first line orthogonal to the axis of rotation, and at least one wedge plate including: a second outer circumference; a radially disposed gap separating first and second ends of the at least one wedge plate such that the at least one wedge plate is wholly discontinuous in a circumferential direction at the gap; and a first inner circumference with a plurality of second ramps, each second ramp including a respective second face surface orthogonal to the axis of rotation or forming a second acute angle with a second line orthogonal to the axis of rotation. The clutch includes an outer race with a second inner circumference. The plurality of first face surfaces is at least partially aligned with the plurality of second surfaces in a circumferential direction. For relative rotation of the outer race with respect to the inner race in a first circumferential direction: at least a portion of the second outer circumference is in contact with the second inner circumference; at least one, but not all, of the first face surfaces are in contact with respective second face surfaces; and the closer respect first and second face surfaces in contact are to the gap in the first circumferential direction, the less a magnitude of a force opposing rotation of the outer race in the first circumferential direction. Rotation of the outer race in a second circumferential direction, opposite the first circumferential direction, causes the rotation of the outer race to lock to rotation of the inner race.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1A:
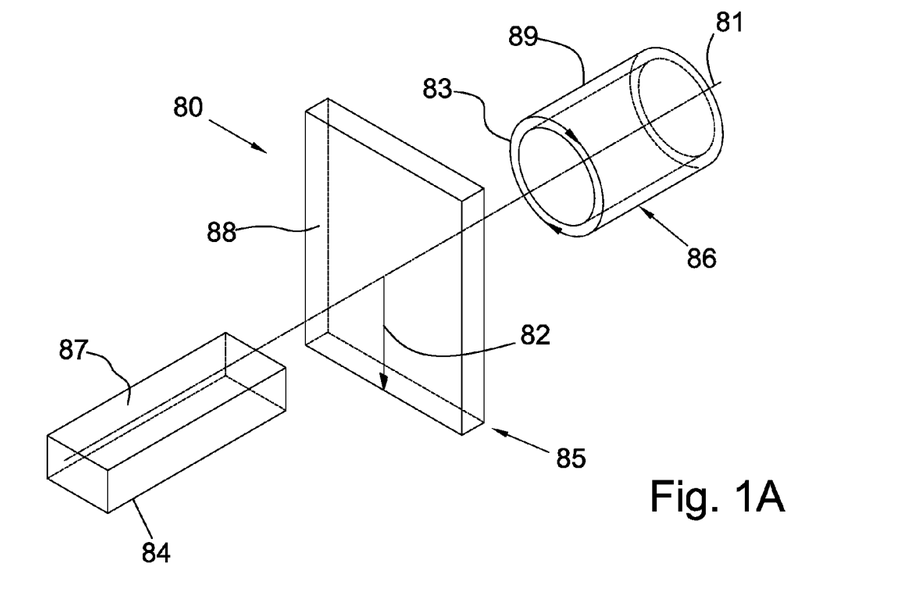
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
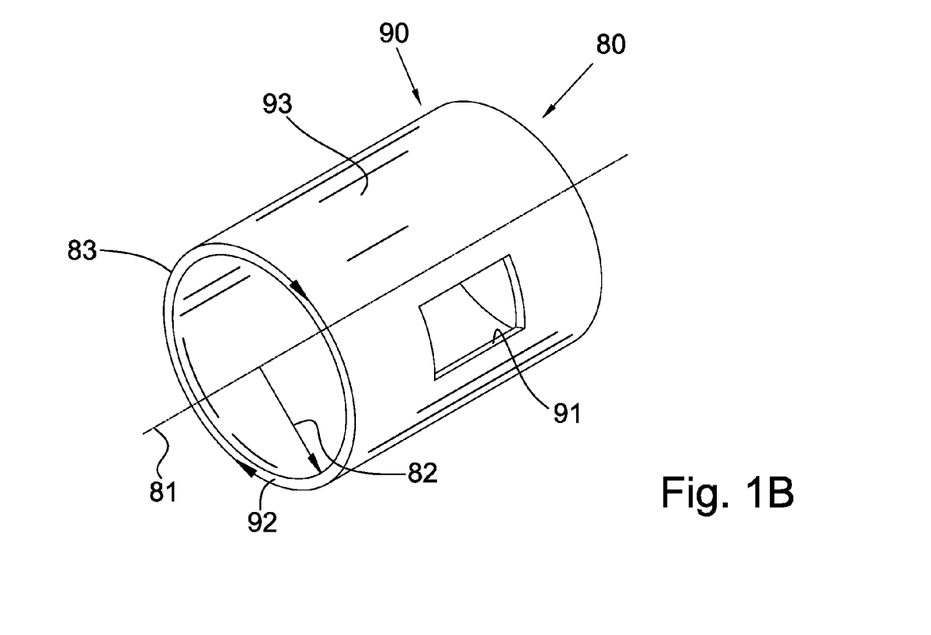
FIG. 1B is a perspective view of an object in the cylindrical coordinate system of FIG. 1A demonstrating spatial terminology used in the present application; and, FIG. 2 is an exploded view of a one-way clutch with reduced freewheel friction.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 2:
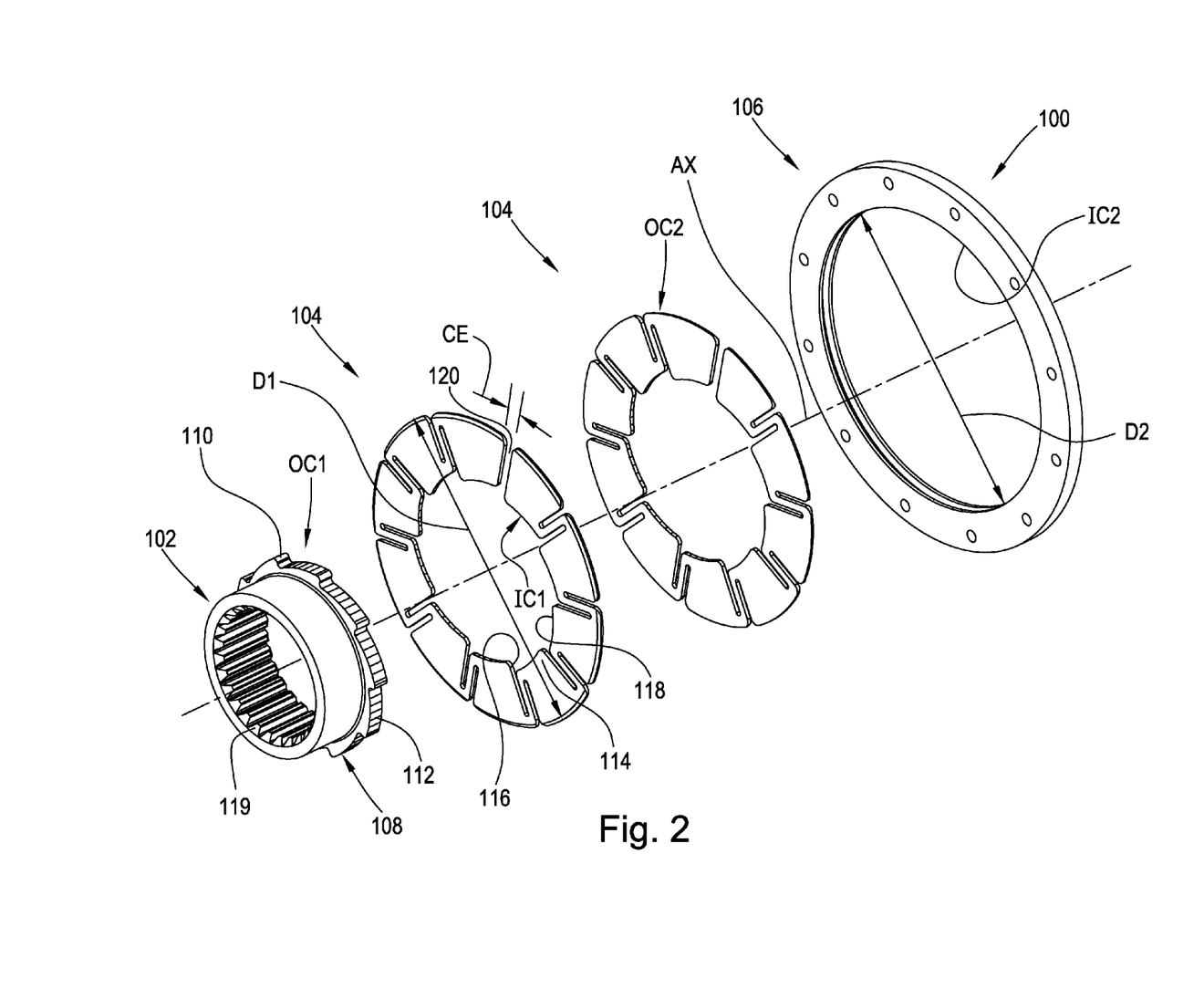

FIG. 2 is an exploded view of one-way clutch 100 with reduced freewheel friction.

Figure 3:
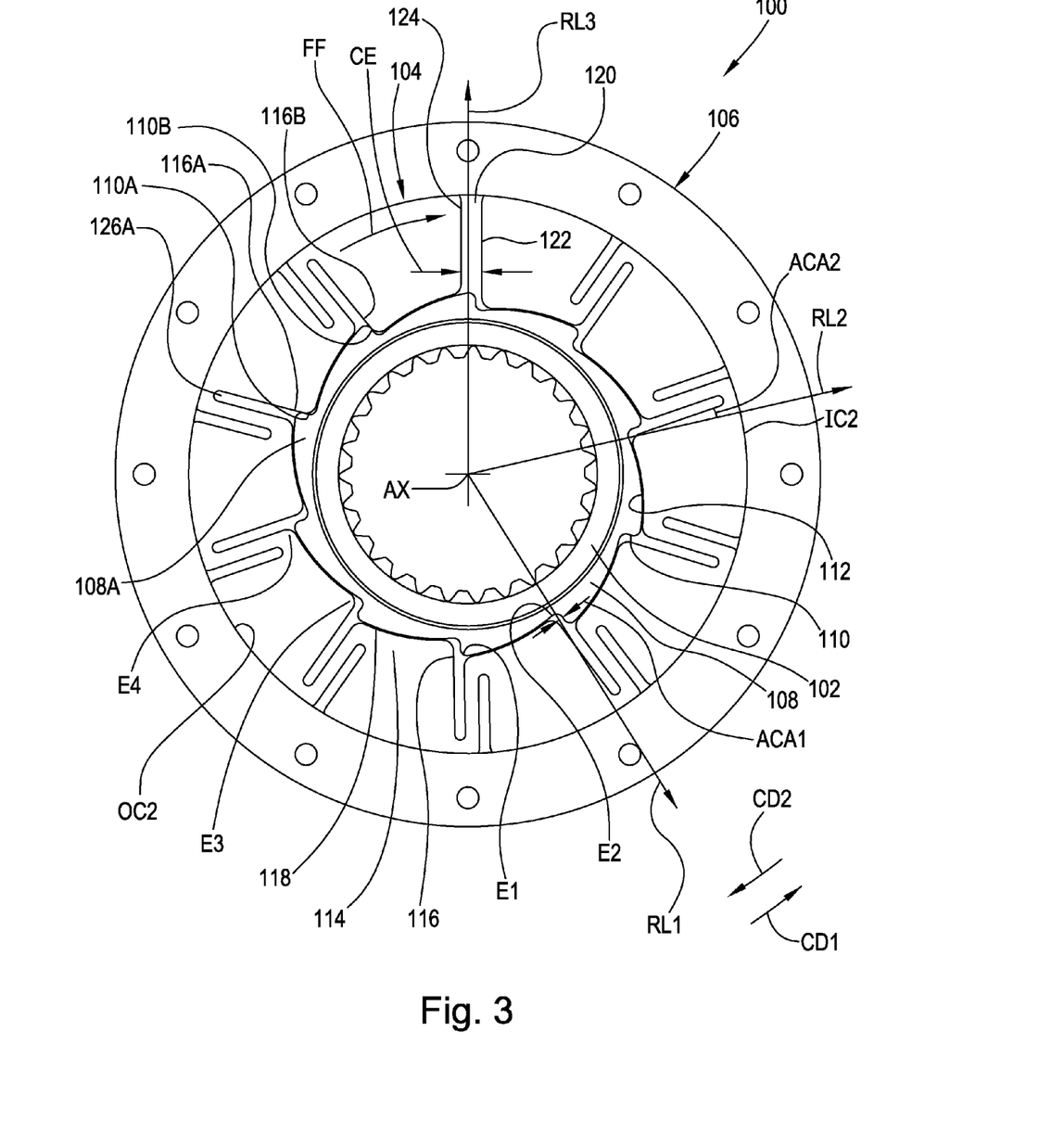
FIG. 3 is a front view of the one-way clutch of FIG. 2 in a free wheel mode.

FIG. 3 is a front view of one-way clutch 100 of FIG. 2 in a free wheel mode. The following should be viewed in light of FIGS. 2 and 3. Clutch 100 includes inner race 102, at least one wedge plate 104, and outer race 106. In an example embodiment, clutch 100 includes two wedge plates 104; however, it should be understood that other numbers of wedge plates are possible. The inner race includes outer circumference OC1 with ramps 108 having face surfaces 110 and ramp surfaces 112. Each wedge plate includes smooth outer circumference OC2 and inner circumference IC1 with ramps 114 having face surfaces 116 and ramp surfaces 118. By smooth outer circumference we mean the circumference is a smooth curved line without abrupt changes. For example, the walls of the slots described below and opening to OC2 are not considered part of OC2.

The outer race includes inner circumference IC2. For relative rotation of the outer race, with respect to the inner race in circumferential direction CD1 (free wheel mode), some, but not all of surfaces 110 are in contact with respective surfaces 116. For example, in FIG. 3, surfaces 110A and 110B are in contact with surfaces 116A and 116B, respectively, and the remaining surfaces 110 are free of contact with surfaces 116. In free wheel mode, the outer race rotates independently of the inner race and plates 104.

Figure 4:
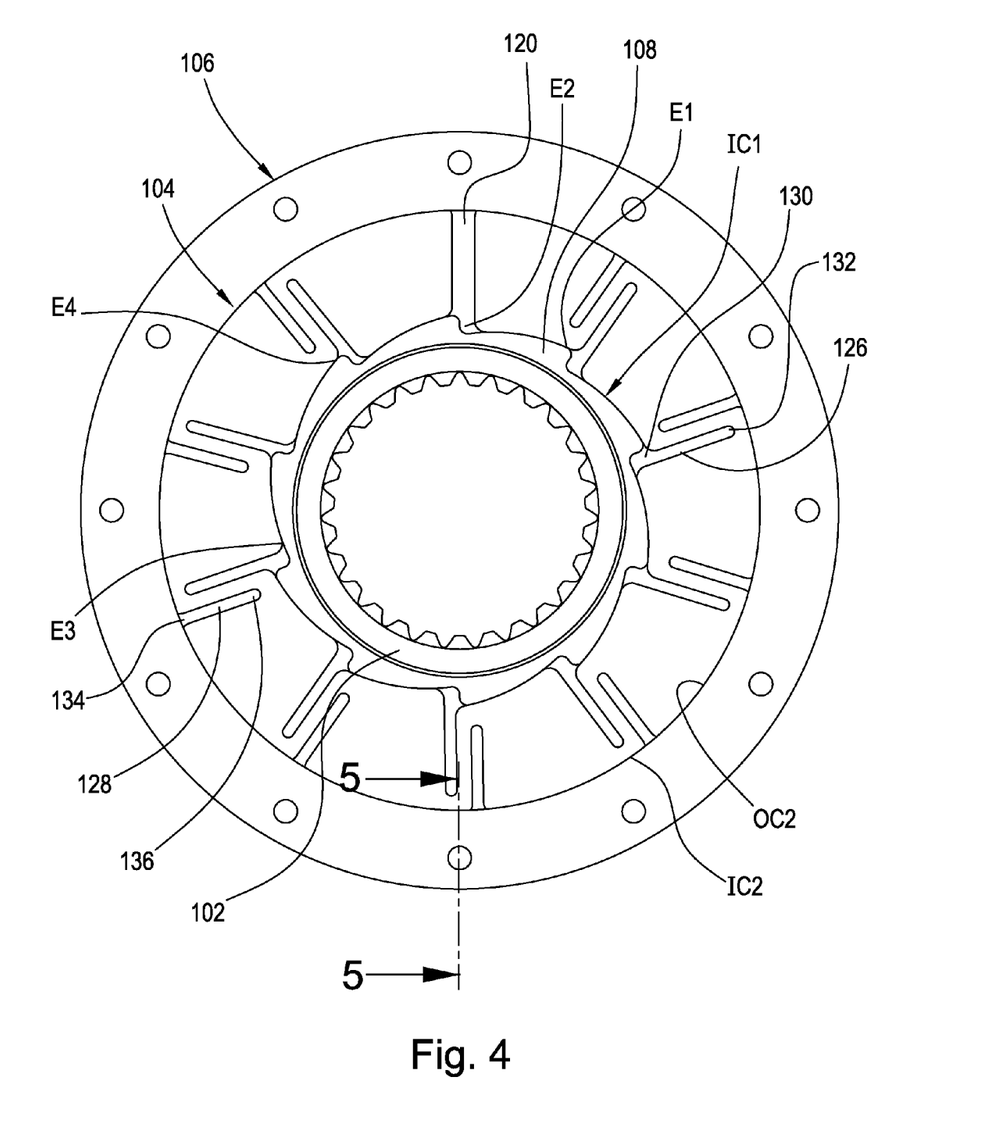
FIG. 4 is a front view of the one-way clutch of FIG. 2 in a locking mode.

FIG. 4 is a front view of one-way clutch of FIG. 2 in a locking mode. The following should be viewed in light of FIG. 2 through 4. In locking mode, the rotation of the outer race is locked to the rotation of the inner race by rotation of the outer race in direction CD2, opposite CD1. In an example embodiment, the inner race is rotationally fixed, for example, via splines 119. That is, the inner race cannot rotate. In this case, in the locking mode, the outer race also is prevented from rotating. In an example embodiment, none of surfaces 110 are in contact with respective surfaces 116 in the locking mode.

In an example embodiment, surfaces 110 are aligned with a line RL1 orthogonal to axis of rotation AX for clutch 100 or form acute angle ACA1 with RL1. In an example embodiment, surfaces 116 are aligned with a line RL2 orthogonal to axis of rotation AX or form acute angle ACA2 with RL2. Respective ends E1 of ramp surfaces 112 are connected to surfaces 110 and respective ends E2 of ramp surfaces 112 are radially inward of ends E1. In an example embodiment, ends E2 connect to face surface 110 for an adjacent ramp 108. Respective ends E3 of ramp surfaces 118 are connected to surfaces 116 and respective ends E4 of ramp surfaces 118 are radially outward of ends E3. Thus, surfaces 112 and 118 displace radially inward in direction CD1.

Each wedge plate includes radially disposed gap 120 separating ends 122 and 124 of the wedge plate such that the wedge plate is wholly discontinuous in a circumferential direction at the gap. For example, radial line RL3 passes through gap 120 without contacting the wedge plate. In general, wedge plate 104 is elastic in a circumferential direction due to gap 120 and diameter D1 for OC2 of wedge plate 104 in a free state (not installed in the outer race) is greater than diameter D2 of IC2 the outer race. Therefore, when a wedge plate is installed in the outer race, circumferential extent CE of the gap is reduced and the elasticity of the wedge plate urges the wedge plate radially outward to contact the outer race and exert radially outward force F on IC2.

In the free wheel mode, force FF, opposing rotation of the outer race in direction CD1, is needed to enable the switch from free-wheel mode to locking mode. A magnitude of force FF is proportional to a magnitude of force F (as F increases, FF likewise increases). The magnitude of F depends on the characteristics of the wedge plate (for example, the difference in respective diameters between OC2 and IC2 and the stiffness of the wedge plate) and the location of the pairs of surfaces 110 and 116, in contact. For example, using end 124 as a starting point for contacting pairs of surfaces 110 and 116, the magnitude of F depends on the location of the first pair of surfaces 110 and 116, in contact, encountered when moving in direction CD2 from gap 120. Specifically, the closer the pair of surfaces is to gap 120 in direction CD1, the less the magnitude of F. For example, if surfaces 110A and 116A form the pair, the magnitude of F is less than if surfaces 110B and 116B form the pair.

Thus, in free wheel mode, the closer the pair of surfaces noted above are to the gap in direction CD1, the less a magnitude of force FF opposing rotation of the outer race in direction CD1. For example, if surfaces 110A and 116A form the pair, FF is less than if surfaces 110B and 116B form the pair.

To shift from the free wheel mode to the locking mode, the outer race engages and rotates, or displaces, the wedge plates in direction CD2 so that ramps 114 shift in direction CD2 with respect to ramps 108. In particular, surfaces 118 slide along surfaces 112 in direction CD2. The sliding of the surfaces cause surfaces 112 and 118 to lock and causes the wedge plates to press against the outer race with more force, rotationally locking the inner race, the wedge plates, and the outer race. As noted above, to enable the outer race to rotate the wedge plate, there must be at least some frictional engagement of the outer race with the wedge plates in the free wheel mode (outer race rotates in direction CD1). If there is no frictional engagement or insufficient frictional engagement, the outer race simply rotates in direction CD2 without displacing the wedge plates. That is, frictional force FF must be present to some degree.

As noted above, in a general configuration of a one-way clutch with a radially expandable blocking element, the frictional engagement of the blocking device and outer race in a free wheel mode (force FF) reduces the efficiency of a power system utilizing the clutch. For example, the frictional engagement undesirably dissipates a portion of the torque applied to the outer race. Advantageously, clutch 100 controls and reduces the magnitude of FF by controlling the number of surfaces 110 in contact with respective surfaces 116. The magnitude of force FF is proportional to the magnitude of F, which in turn is determined by the position of surfaces 110 in contact with respective surfaces 116. For example, as noted above, in the free wheel mode, the closer the pair of surfaces noted above are to the gap in direction CD1, the less a magnitude of force FF opposing rotation of the outer race in direction CD1.

Thus, the inner race and the wedge plates can be configured such that a specified pair or pairs of surfaces 110 and 116 are in contact in the free wheel mode to produce a desired magnitude of FF, for example, the lowest magnitude of FF needed to enable the clutch switching from the free wheel mode to the locking mode. This configuration in turn advantageously reduces frictional losses for the outer race in the free wheel mode, increasing the efficiency of a device using clutch 100.

In an example embodiment, clutch 100 includes slots 126 and 128. Slots 126 include respective radially innermost ends 130 opening to IC1 and respective radially outermost ends 132 enclosed by the wedge plate. Slots 128 include respective radially outer most ends 134 opening to OC2 and respective radially innermost ends 136 enclosed by the wedge plate. In an example embodiment, slots 126 and 128 at least partially overlap in a circumferential direction, for example, CD1 or CD2.

In an example embodiment, slots 126 and 128 provide a mechanism for modulating the magnitude of F. As noted above, when a wedge plate is installed in the outer race, the elasticity of the wedge plate urges the wedge plate radially outward to contact the outer race and exert force F on the outer race. Contact between surfaces 110 and 116 and the subsequent reaction of slots 126 and 128 acts to reduce the magnitude of F.

Figure 5:
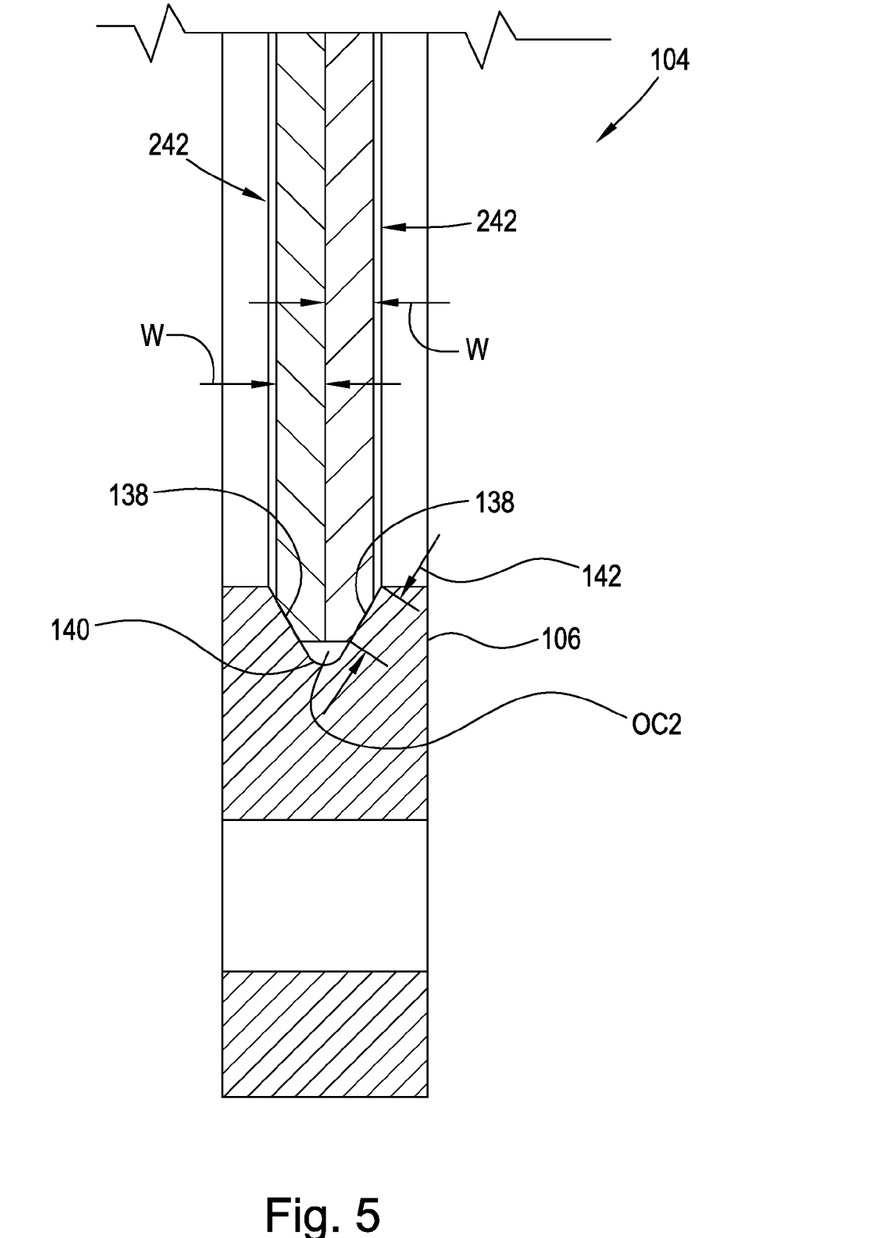
FIG. 5 is a cross-sectional view of the one-way clutch of FIG. 2 generally along line 5-5 in FIG. 4.

FIG. 5 is a cross-sectional view of the one-way clutch 100 of FIG. 2 generally along line 5-5 in FIG. 4. In an example embodiment, respective OC2s are shaped to form chamfers 138 and IC2 is configured to form V-shaped indent 140 in which the chambers are disposed. Proper design and function of a wedge one-way clutch requires that the frictional engagement between wedge plates and the outer race be as consistent as possible. The area of contact between the wedge plates and the outer race is dependent on width W of the wedge plates, which determines extent 142 of the chamfers. For example, increasing W increases 142, which increases the frictional contact between the wedge plate and the outer race during free wheel mode. However, due to manufacturing constraints, it is difficult to obtain a consistent thickness W for the wedge plates. The variability of thickness W in turn results in undesirable variation of frictional engagement between the wedge plate and the outer race. The negative impacts due to the undesirable variation of frictional engagement in the free wheel mode are multiplied as the area of engagement between the wedge plates and the outer race increases.

Thus, the impacts are maximized when the entirety of the wedge plate outer circumferences contact the outer race in the free wheel mode. Advantageously, clutch 100 minimizes the negative impacts of width variations by limiting the circumferential extent of contact between IC2 and OC2.

Figure 6:
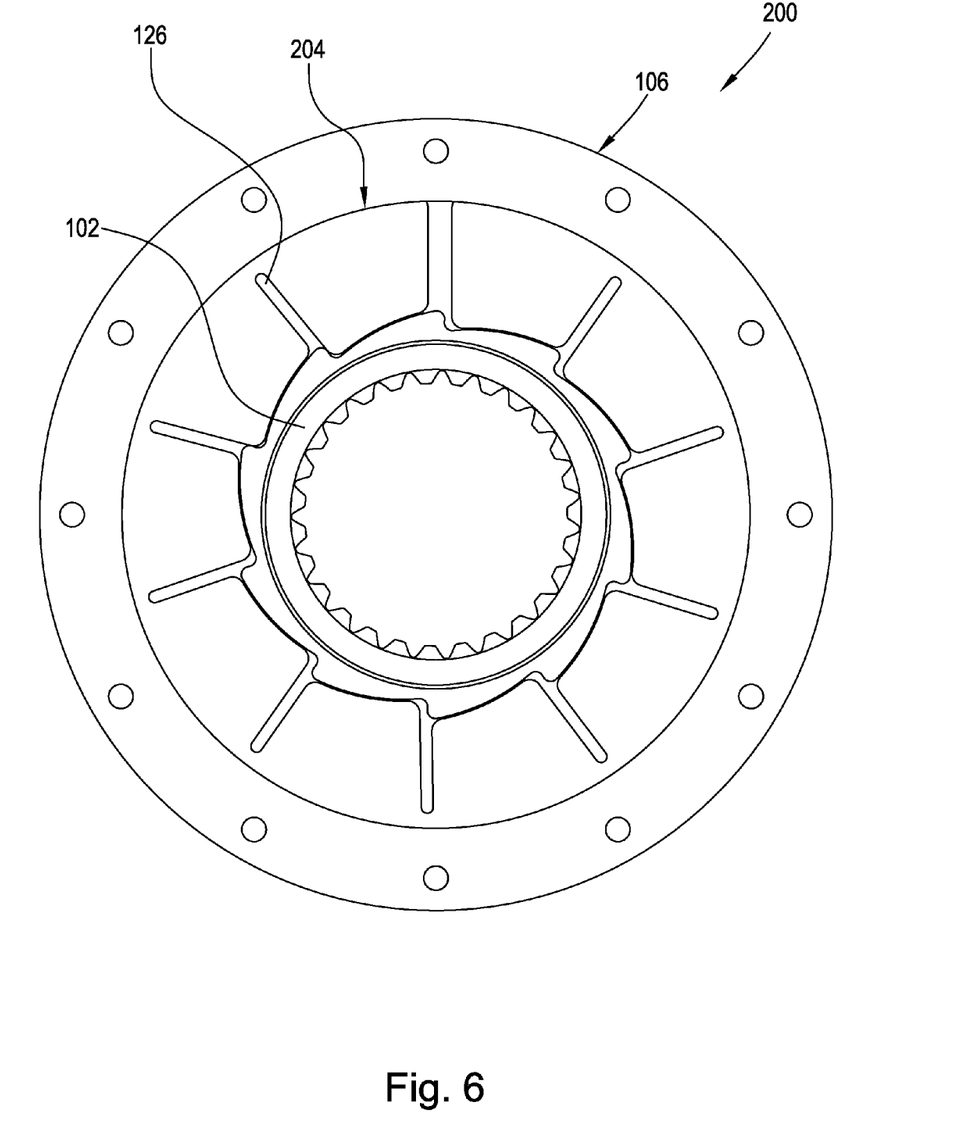
FIG. 6 is a front view of a one-way clutch with reduced freewheel friction in a freewheel mode.

FIG. 6 is a front view of one-way clutch 200 with reduced freewheel friction in a freewheel mode. In an example embodiment, wedge plate 204 does not include slots, such as slots 128, on an outer circumference. The discussion regarding clutch 100 is generally applicable to clutch 200. Without slots 128, the magnitude of F is generally increased. For example, assuming wedge plates 104 and 204 are the same except for wedge plate 204 lacking slots 128, FF will typically be greater for clutch 200 than clutch 100.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A one-way clutch, comprising:
an inner race including a first outer circumference with a plurality of first ramps, each first ramp including:
a respective first face surface orthogonal to an axis of rotation for the one-way clutch or forming a first acute angle with a first line orthogonal to the axis of rotation; and;
a respective first ramp surface with a first end connected to the respective first face surface and a second end more radially inward than the first end;
at least one wedge plate including a smooth second outer circumference and a first inner circumference with a plurality of second ramps, each second ramp including:
a respective second face surface orthogonal to the axis of rotation in the radial direction or forming a second acute angle with a second line orthogonal to the axis of rotation; and;
a respective second ramp surface with a third end connected to the respective second face surface and a fourth end more radially outward than the third end; and,
an outer race including a second inner circumference, wherein:
the outer race is rotatable with respect to the inner race in a first circumferential direction;
for relative rotation of the outer race with respect to the inner race in the first circumferential direction, at least one, but not all, of the respective first face surfaces are in contact with respective second face surfaces; and,
rotation of the outer race in a second circumferential direction, opposite the first circumferential direction, causes the rotation of the outer race to lock to rotation of the inner race.

2. The one-way clutch of claim 1, wherein the at least one wedge plate includes a radially disposed gap separating first and second ends of the at least one wedge plate such that the at least one wedge plate is wholly discontinuous in a circumferential direction at the gap.

3. The one-way clutch of claim 1, wherein when the rotation of the outer race is locked to rotation of the inner race, all the respective first face surfaces are free of contact with the respective second face surfaces.

4. The one-way clutch of claim 1, wherein:
the at least one wedge plate includes a radially disposed gap separating first and second ends of the at least one wedge plate such that the at least one wedge plate is wholly discontinuous in a circumferential direction at the gap; and,
for relative rotation of the outer race in the first circumferential direction, the closer respect first and second face surfaces in contact are to the gap in the first circumferential direction, the less a magnitude of a force opposing rotation of the outer race in the first circumferential direction.

5. The one-way clutch of claim 1, wherein:
the at least one wedge plate includes:
a first plurality of slots with respective first radially innermost ends opening to the first inner circumference and respective first radially outermost ends enclosed by the at least one wedge plate; and,
a second plurality of slots with respective second radially outer most ends opening to the second outer circumference and respective second radially innermost ends enclosed by the at least one wedge plate; and,
the plurality of first face surfaces forms respective portions of the boundaries of the first plurality of slots.

6. The one-way clutch of claim 5, wherein the first and second pluralities of slots at least partially overlap in the first circumferential direction.

7. The one-way clutch of claim 1, wherein:
the at least one wedge plate includes:
a first plurality of slots with respective first radially innermost ends opening to the first inner circumference and respective first radially outermost ends enclosed by the at least one wedge plate; and,
a second plurality of slots with respective second radially outer most ends opening to the second outer circumference and respective second radially innermost ends enclosed by the at least one wedge plate;
for relative rotation of the outer race with respect to the inner race in the first circumferential direction, a circumferential width of a first slot with a boundary partially formed by a respective first face surface in contact with a respective second face surface is greater than a respective circumferential width of a first slot bounded by a respective first face surface not in contact with a respect second face surface.

8. The one-way clutch of claim 1, wherein for relative rotation of the outer race in the first circumferential direction, the outer race rotates relative to the at least one wedge plate.

9. A one-way clutch, comprising:
an axis of rotation;
an inner race including a first outer circumference including a plurality of first ramps, each first ramp including a respective first face surface orthogonal to the axis of rotation or forming a first acute angle with a first line orthogonal to the axis of rotation;
at least one wedge plate including:
a second outer circumference;
a radially disposed gap separating first and second ends of the at least one wedge plate such that the at least one wedge plate is wholly discontinuous in a circumferential direction at the gap; and,
a first inner circumference with a plurality of second ramps, each second ramp including a respective second face surface orthogonal to the axis of rotation or forming a second acute angle with a second line orthogonal to the axis of rotation; and,
an outer race with a second inner circumference, wherein:
the plurality of first face surfaces is at least partially aligned with the plurality of second surfaces in a circumferential direction;
for relative rotation of the outer race with respect to the inner race in a first circumferential direction:
at least a portion of the second outer circumference is in contact with the second inner circumference;
at least one, but not all, of the first face surfaces are in contact with respective second face surfaces; and,
the closer respective first and second face surfaces in contact are to the gap in the first circumferential direction, the less a magnitude of a radially outward force exerted by the at least one wedge plate on the outer race; and,
rotation of the outer race in a second circumferential direction, opposite the first circumferential direction, causes the rotation of the outer race to lock to rotation of the inner race.

10. A one-way clutch, comprising:
an axis of rotation;

an inner race including a first outer circumference including a plurality of first ramps, each first ramp including a respective first face surface orthogonal to the axis of rotation or forming a first acute angle with a first line orthogonal to the axis of rotation;

at least one wedge plate including:

a second outer circumference;

a radially disposed gap separating first and second ends of the at least one wedge plate such that the at least one wedge plate is wholly discontinuous in a circumferential direction at the gap; and,    a first inner circumference with a plurality of second ramps, each second ramp including a respective second face surface orthogonal to the axis of rotation or forming a second acute angle with a second line orthogonal to the axis of rotation; and, an outer race with a second inner circumference, wherein:

the plurality of first face surfaces is at least partially aligned with the plurality of second surfaces in a circumferential direction;

for relative rotation of the outer race with respect to the inner race in a first circumferential direction:

at least a portion of the second outer circumference is in contact with the second inner circumference;

at least one, but not all, of the first face surfaces are in contact with respective second face surfaces; and,      the closer respective first and second face surfaces in contact are to the gap in the first circumferential direction, the less a magnitude of a force opposing rotation of the outer race in the first circumferential direction; and,    rotation of the outer race in a second circumferential direction, opposite the first circumferential direction, causes the rotation of the outer race to lock to rotation of the inner race.

* * * * *